United States Patent [19]

Bachmann et al.

[11] Patent Number: 4,653,721
[45] Date of Patent: Mar. 31, 1987

[54] DEVICE FOR COUPLING THE SHANK AND THE VALVING ELEMENT OF A SHUTOFF VALVE TO EACH OTHER

[75] Inventors: Ludwig Bachmann, Frankenthal; Heinz-Jürgen Ruckert, Grossniedesheim, both of Fed. Rep. of Germany

[73] Assignee: Klein, Schanzlin & Becker Aktiengesellschaft, Frankenthal, Fed. Rep. of Germany

[21] Appl. No.: 838,530

[22] Filed: Mar. 11, 1986

[30] Foreign Application Priority Data

Mar. 14, 1985 [DE] Fed. Rep. of Germany ....... 3509082

[51] Int. Cl.$^4$ .................. F16K 25/00; F16K 51/00
[52] U.S. Cl. ............................ 251/88; 403/284; 403/326
[58] Field of Search ............... 251/84, 85, 86, 88; 403/274, 284, 326

[56] References Cited

U.S. PATENT DOCUMENTS

| 391,445 | 10/1888 | Williams | 251/88 |
|---|---|---|---|
| 1,111,391 | 9/1914 | Kneass | 251/86 |
| 1,694,595 | 12/1928 | Howard | 251/88 |
| 2,412,330 | 12/1946 | Glanz et al. | 251/88 |
| 2,490,043 | 12/1949 | Funk | 251/88 |
| 3,204,922 | 9/1965 | McInerney | 251/88 |
| 3,326,513 | 6/1967 | Hall | 251/86 |
| 3,815,873 | 6/1974 | Hendrick | 251/85 |

FOREIGN PATENT DOCUMENTS

| 12106 | 10/1956 | Fed. Rep. of Germany | 251/88 |
|---|---|---|---|
| 958517 | 1/1957 | Fed. Rep. of Germany | 251/88 |
| 1956491 | 8/1966 | Fed. Rep. of Germany | |
| 399064 | 6/1909 | France | 251/88 |
| 1071353 | 8/1954 | France | 251/88 |
| 11477 | of 1886 | United Kingdom | 251/88 |
| 884529 | 12/1961 | United Kingdom | 251/88 |

Primary Examiner—George L. Walton
Attorney, Agent, or Firm—Peter K. Kontler

[57] ABSTRACT

The valving element of a valve has an axially projecting tubular extension with an open-ended socket for one end section of a shank which has a larger-diameter cylindrical portion in the deepmost portion of the socket, a smaller diameter cylindrical portion adjacent the open end of the socket, and a concave annular surface between the two cylindrical portions. The concave surface abuts a split ring which has a circular cross-sectional outline and is held in the socket as a result of deformation of the extension close to the open end of the socket. The annular surface abuts the adjacent portion of the external surface of the split ring, the same as the adjacent portion of the internal surface of the extension.

9 Claims, 1 Drawing Figure

U.S. Patent    Mar. 31, 1987    4,653,721
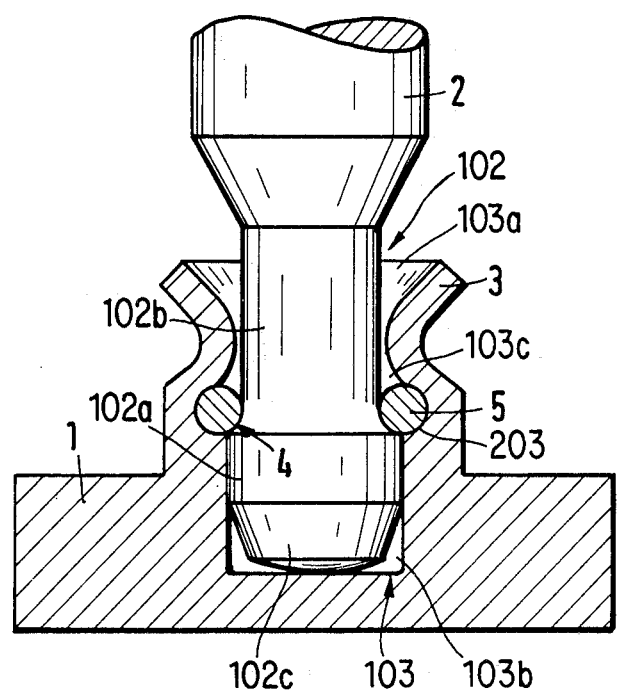

DEVICE FOR COUPLING THE SHANK AND THE VALVING ELEMENT OF A SHUTOFF VALVE TO EACH OTHER

BACKGROUND OF THE INVENTION

The invention relates to improvements in valves of the type wherein a shank or a stem is anchored in a disc-shaped or otherwise configurated valving element. More particularly, the invention relates to improvements in devices for rotatably coupling the shank and the valving element of a valve or another flow regulating element to each other.

German Utility Model No. 19 56 491 discloses a valve wherein the valving element has a tubular extension for one end section of a shank. The end section has an annular shoulder between a larger-diameter portion and a smaller-diameter portion, and such shoulder is engaged by a two-piece ring which is confined in the socket of the extension so that the valving element and the shank can rotate relative to each other. The extension is deformed in a region adjacent to the ring so that the latter cannot be extracted from the socket.

The ring which is used in the valve of the Utility Model comprises two pieces of jointly drilled semi-round steel stock. The main retaining or holding action takes place at the end faces of the ring. One end face abuts a shoulder of the valving element and the other end face abuts a shoulder of the shank. A drawback of such proposal is that, in order to enlarge the area of contact between one end face of the ring and the shoulder of the shank, it is necessary to provide the shank with a relatively large radially extending annular shoulder which can affect the stability of the shank and of the assembled valve. Moreover, and since the transition from the shoulder to the periphery of the adjacent cylindrical portion of the shank is very pronounced, such region of the shank is subjected to substantial impact stresses which can lead to a breakage of the shank at its shoulder. The utilization of a concave shoulder on the shank would merely lead to a reduction of the stress-receiving area of such shoulder, i.e., the depth of the cut which is required to make the shoulder would have to be increased with attendant additional weakening of the shank. Still further, the specially designed two-piece ring is expensive and its insertion into the socket of the extension is a complex procedure.

OBJECTS AND SUMMARY OF THE INVENTION

An object of the invention is to provide a valve or another fluid flow regulating or controlling apparatus wherein the shank or stem is anchored in an extension of the valving element in a novel and improved way.

Another object of the invention is to provide a simple, reliable and inexpensive connection between the shank and the valving element of a shutoff valve or the like.

A further object of the invention is to provide a connection which can be established by utilizing available machines and available mass-produced component parts.

An additional object of the invention is to provide a novel and improved method of assembling the valving element and the shank or stem of a valve in such a way that the two parts can rotate relative to each other about a common axis but are held against other movements in a simple, reliable and inexpensive way.

Still another object of the invention is to provide a novel and improved valving element and a novel and improved shank for use in a valve of the above outlined character.

An additional object of the invention is to provide a shank which need not be unduly weakened for the purpose of ensuring reliable anchoring of one of its end sections in the valving element.

One feature of the present invention resides in the provision of a valve which comprises a substantially disc-shaped valving element having an axially projecting tubular extension which is preferably made of a ductile metallic material and defines a socket with an open end, an inner portion remote from the open end and an outer portion between the inner portion and the open end. The valve further comprises an elongated shank having an end section which is disposed in the socket and includes a larger-diameter portion in the inner portion of the socket, a smaller-diameter portion in the outer portion of the socket, and a concave annular shoulder or surface between the two portions of the end section. The valve also comprises a split ring which abuts the concave annular surface of the end section and is in large-area contact with the end section. The outer portion of the socket has an inner diameter smaller than the outer diameter of the ring so that the ring and the larger-diameter portion of the end section cannot be extracted from the extension. The ring is preferably a commercially available split ring which is made of spring steel or another suitable metallic material. Such ring has a preferably circular cross-sectional outline, and the radius of its outline preferably matches the radius of curvature of the concave annular surface between the larger-diameter portion and the smaller-diameter portion of the end section of the shank. The internal surface of the extension preferably includes an annular concave portion which is in large-area contact with the ring and is adjacent to the annular concave surface of the end section. The surface of the end section preferably conforms, as closely as possible, to the outline of the adjacent portion of the split ring, the same as the aforementioned concave annular portion of the internal surface of the extension. This ensures reliable retention of the end section in the socket, even if the radial dimension of the concave annular surface on the shank is not pronounced. The extension and the end section can conform to the outline of the split ring along an arc of more than 180 degrees, e.g., along an arc in excess of 270 degrees.

The shank is rotatable or can be mounted for rotation in the extension of the valving element.

Each of the two portions of the end section of the shank can constitute a cylinder, and the annular concave surface of the end section preferably extends radially inwardly from the periphery of the larger-diameter cylinder to merge gradually into the periphery of the smaller-diameter cylinder. Such surface can be formed in a milling machine.

The outer diameter of the ring can exceed the inner diameter of the inner portion of the socket.

The novel features which are considered as characteristic of the invention are set forth in particular in the appended claims. The improved valve itself, however, both as to its construction and the mode of assembling its shank with the valving element, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary axial sectional view of a valve wherein one end section of the shank is anchored in an extension of the valving element in accordance with a feature of the invention.

DESCRIPTION OF THE PREFERRED EMBODIMENTS

The drawing shows a portion of a valve (e.g., a shutoff valve with a reciprocable valving element) which comprises a substantially disc-shaped valving element 1 having a circular outline and including a tubular extension 3 which is made of a ductile metallic material and defines a socket 103 coaxial with the major or larger-diameter portion of the valving element 1. The socket 103 has an open end at 103a, an inner or first portion 103b which is remote from the open end 103a, and an outer or second portion 103c which is disposed between the portion 103b and the open end 103a. The socket 103 serves to receive the specially configured end section 102 of an elongated valve stem or shank 2 which is rotatably anchored in the extension 3 in such a way that the valving element 1 and the shank 2 can rotate about their common axis but the shank is held against axial movement relative to the valving element and vice versa.

The end section 102 comprises a larger-diameter cylindrical portion 102a and a conical end portion 102c in the portion 103b of the socket 103, a smaller-diameter cylindrical portion 102b in the portion 103c of the socket 103, and a concave annular surface 4 which extends substantially radially inwardly from the periphery of the portion 102a and merges gradually into the periphery of the portion 102b.

The means for holding the larger-diameter portion 102a in the portion 103b of the socket 103 comprises a one-piece split ring 5 which is preferably made of spring steel and has a circular cross-sectional outline. The radius of such outline (namely half the difference between the inner and outer radii of the ring 5) matches or closely approximates the radius of curvature of the surface 4, i.e., such surface is in large-area contact with the adjacent portion of the ring 5 (substantially between the three and six o'clock positions, as seen in the left-hand half of the drawing).

That part of the extension 3 which surrounds the outer portion 103c of the socket 103 is deformed (e.g., by rolling) so that the smallest diameter of the surface surrounding the portion 103c is less than the outer diameter of the ring 5. In addition, that portion (203) of the annular internal surface of the extension 3 which is adjacent to the ring 5 is deformed so that it has a concave shape and closely hugs the outline of the adjacent portion of the ring 5. Thus, the surface portion 203 has a radius of curvature which is the same as that of the surface 4, and the surface 4 and surface portion 203 together contact the ring 5 along an arc exceeding 180 degrees (as considered in the plane of the drawing, i.e., in a plane which includes the common axis of the shank 2 and valving element 1).

The difference between the diameters of the cylindrical portions 102a and 102b of the end section 102 need not be pronounced, and this does not affect the stability of the connection between the shank 2 and the valving element 1 because the ring 5 is in large-area contact with the surface 4 as well as with the surface portion 203. The surface 4 can be formed by milling or by any other suitable material removing technique. The deformation of extension 3 in the region of the outer portion 103c of the socket 103 preferably does not involve any removal of material but merely a rolling or another deforming treatment of the extension.

In order to assemble the shank 2 with the valving element 1, the section 102 is inserted into the socket 103 before the extension 3 is deformed. The split ring 5 already surrounds the portion 102b at the time the portion 102a is being introduced into the socket 103. In the next step, the ring 5 is caused to abut the surface 4, and the extension 3 is thereupon deformed to ensure that the shank 2 can rotate relative to but cannot move axially of the valving element 1.

An important advantage of the improved valve is that the means for connecting the valving element 1 to the shank 2 can employ a commercially available mass-produced split ring. Such split rings are normally made of a high-quality spring steel which can stand pronounced shearing stresses. This material is sufficiently hard to provide for a desirable transition between the materials of the parts 1 and 2 and reduce the likelihood of wear of the surface 4 and the possibility of seizing, even in the absence of any lubrication of the surface 4. The circular cross-sectional outline of the ring 5 renders it possible to establish a gradual transition between the surface 4 of the section 102 and the surface portion 203 of the extension 3. This reduces the likelihood of the development of undesirably large impact stresses in the region of the shoulder between the cylindrical portions 102a and 102b of the shank section 102. Since the difference between the diameters of the cylindrical portions 102a and 102b need not be pronounced, the formation of smaller-diameter portion 102b does not unduly weaken the shank 2 in the region of the shoulder or surface 4 so that the shank can take up and can also transmit large tensional, compressive and torsional stresses.

Another important advantage of the improved valve is that the establishment of a reliable connection between the valving element 1 and the shank 2 takes up little time and can be carried out by utilizing available conventional machines. All that is necessary is to ensure that the ring 5 be placed into large-area contact with the surface 4 and preferably also so that the ring 5 be brought into large-area contact with the surface portion 203 as a result of deformation of the extension 3. The diameter of the surface surrounding the periphery of the larger-diameter portion 102a of the shank section 102 preferably matches or only slightly exceeds the diameter of the portion 102a. This ensures that the shank 2 is in accurate axial alignment with the valving element 1 before the extension 3 is deformed to move its surface portion 203 into large-area contact with the adjacent portion of the ring 5. The original inner diameter of that portion of the extension 3 which surrounds the outer portion 103c of the socket 103 can match or approximate the outer diameter of the ring 5. Such inner diameter can be obtained by removing material from the extension 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a valve, particularly in a shutoff valve, the combination of a valving element comprising a tubular extension defining a socket having an open end, a first portion remote from and a second portion nearer to said open end; a shank having a section disposed in said socket and including a larger-diameter portion in said first portion, a smaller-diameter portion in said second portion and a concave annular surface defining a circumferentially complete arcuate shoulder between said portions thereof; and a one-piece ring extending along at least the major part of the circumference of said shoulder and abutting said shoulder essentially throughout said major part, said ring having a circular cross-sectional outline, and said shoulder having a radius of curvature which equals or approximates the radius of said outline, said second portion of said socket extending radially inwardly defining the second portion and extending toward the smaller diameter portion of said section and having an inner diameter smaller than the outer diameter of said ring so that the ring and the larger-diameter portion of said section are confined in said extension against extraction from said socket by said should and said radially inwardly extending second portion.

2. The combination of claim 1, wherein said ring is a split ring.

3. The combination of claim 1, wherein said extension has an internal surface including an annular concave portion conforming to and cooperating with the surface of the ring adjacent to said concave annular surface.

4. The combination of claim 3, wherein said annular surface and said portion of said internal surface contact said ring along an arc of more than 180 degrees, as considered in a plane including the axis of said ring.

5. The combination of claim 1, wherein said extension consists of a ductile metallic material.

6. The combination of claim 1, wherein said valving element has a circular outline and said extension is disposed axially of said valving element, said shank being coaxial with said valving element and being rotatable relative to said extension.

7. The combination of claim 1, wherein the larger-diameter portion of said section includes a first cylinder and the smaller-diameter portion of said section includes a second cylinder, said annular surface extending substantially radially inwardly from the periphery of said first cylinder and merging gradually into the periphery of said second cylinder.

8. The combination of claim 1, wherein the outer diameter of said ring exceeds the diameter of the first portion of said socket.

9. The combination of claim 1, wherein said second portion of said socket includes a first section having an inner diameter at least equal to the outer diameter of said ring, and a radially inwardly deformed second section adjacent to said ring having an inner diameter smaller than the outer diameter of said ring.

* * * * *